…

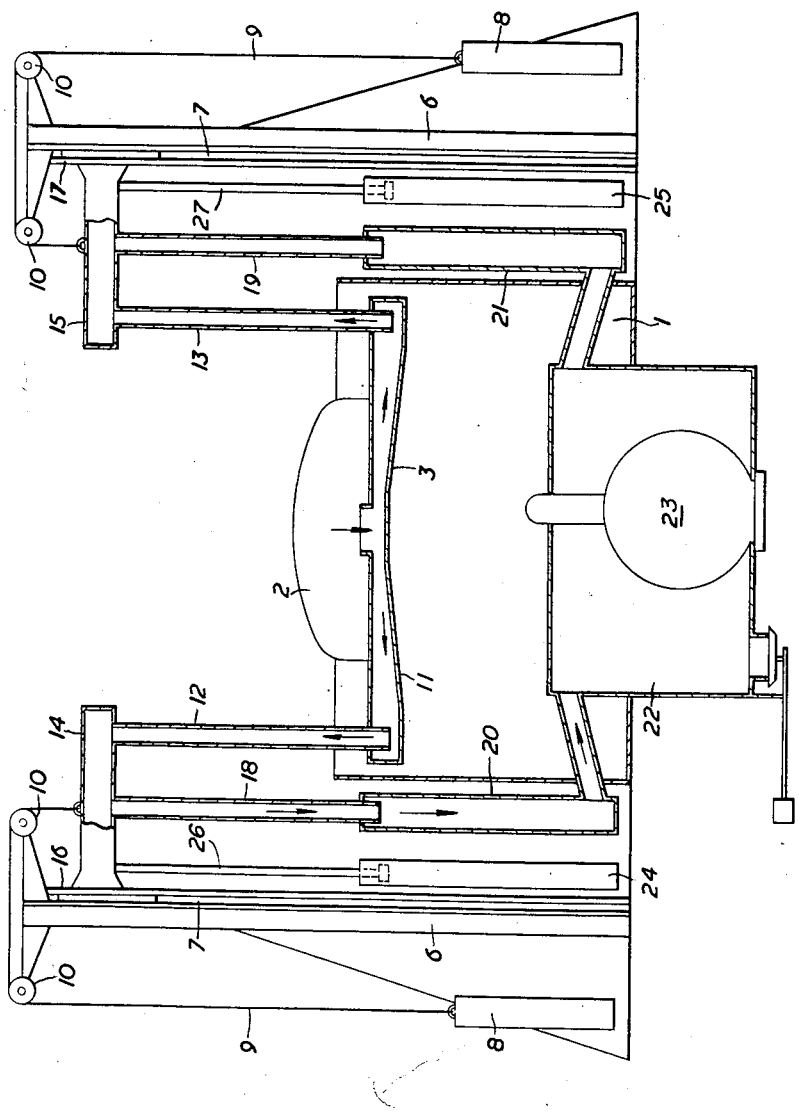

United States Patent Office 3,090,432
Patented May 21, 1963

3,090,432
MANUFACTURE OF ARTICLES FROM FIBROUS MATERIAL
Charles Henry Mayne, Woodford Green, England, assignor to Hawley Products Company, St. Charles, Ill.
Filed Aug. 15, 1960, Ser. No. 49,798
Claims priority, application Great Britain Aug. 25, 1959
5 Claims. (Cl. 162—393)

This invention relates to apparatus for molding bodies from fibrous material.

The molding of bodies from fibrous materials is quite well known. One known method of molding involves drawing the fibrous material from a bath of slurry containing the material onto a perforated molding form or mold by means of a suction induced in the interior of the form or mold, whilst the form or mold is immersed within the bath of the slurry. When sufficient material has been drawn onto the mold it is the usual practice to raise the mold or form above the surface of the bath in order that the body formed on the mold may be removed therefrom. In order to produce the desired vacuum in the interior of the mold it is known to use a flexible conduit means connecting the mold to the remainder of the vacuum system which is used to produce the suction in the mold or form. It has been found, in practice, that the presence of such a flexible conduit introduces an inherent defect inasmuch as the continuous raising and lowering of the mold or form over a long period of usage tends to weaken and eventually produce leakages in the flexible conduit itself or in the regions of connection of the conduit to the mold or form or to the remainder of the vacuum system.

Broadly according to the present invention there is provided molding apparatus comprising a bath for the slurry, a mold or form, means for lowering and raising a mold or form with respect to the bath so that the mold or form is immersible in slurry, wherein part of the means for supporting the mold is utilised as part of the vacuum system used to produce a relatively lower pressure within the interior of the mold.

For a better understanding of the invention and to show how the same may be carried to effect one constructional form of molding apparatus will be described in greater detail in relation to the accompanying drawing which schematically illustrates molding apparatus.

The apparatus includes a bath 1 for the slurry of fibrous material. The mold or form 2 is supported within the bath 1 by a cradle 3. The cradle is slidably carried and guided for up and down movement in a supporting framework comprising supporting columns 6 provided with guideways 7. The columns are located at opposite sides of the bath 1.

A counter-balance arrangement including weights 8, ropes 9 and pulleys 10 takes up a substantial part of the weight of the cradle 3 and the mold 2.

The cradle is U-shaped, the base part of the U serving to support the mold or form 2 so that the mold or form is located between the arms 12, 13 of the U. The arms of the U, which are vertical, are connected to short horizontal stub arms 14, 15. The stub arms 14, 15 are co-linear and are in turn connected with slide means 16, and 17 which slide in the guide-ways 7 in the supporting columns 6. The vertical arms 12, 13 of the U and the horizontal base part 11 of the U are hollow. Each stub arm is connected with a hollow vertical downwardly directed tube 18, 19, each tube being parallel to the arms of the U. Each tube is vacuum tight slidable within an associated cylinder 20, 21. Each cylinder is connected with a vacuum system which includes a vacuum header tank 22, and a vacuum pump 23. A portion of each stub arm is hollow the hollow portion being such such that the interior of the associated hollow tube 18 or 19 is connected with the interior of the associated vertical arm 12 or 13 of the U-shaped cradle.

With this arrangement the interior of the mold 2 is connected into the vacuum system via the base part 11 of the U, both arms 12, 13 of the U, both stud arms 14, 15, both hollow tubes 18, 19 and both cylinders 20, 21.

The cradle is moved upwardly and downwardly relative to the supporting framework by pneumatic means comprising ram cylinders 24, 25 and ram rods 26, 27 which are connected to the stub arms.

The apparatus is used as follows:

When it is desired to mold an article, the molding form or mold 2 is moved downwardly into the bath 1 by the pneumatic ram. As the cradle 3 on which the molding form or mold is mounted is moved downwardly the hollow rods 18, 19 move downwardly into the cylinders 20, 21. After the mold 2 has been immersed to the desired depth a vacuum is produced within the vacuum system whereupon material is drawn towards the mold or form. The water passes through the holes in the mold and enters into the interior of the mold and then flows into the base part 11 of the U-shaped cradle 3, up the vertical arms 12, 13 of the cradle, along the hollow portion of each stub arm 14, 15 and down through hollow tubes 18, 19 and their associated cylinders 20, 21 into the remainder of the vacuum system.

What we claim is:

1. An apparatus for molding bodies from fibrous material comprising a tank adapted to hold a slurry of said fibrous material, a mold upon which said fibrous material is to be deposited, a hollow U-shaped cradle for supporting said mold, co-linear partially hollow horizontal stub arms terminating in vertical slide means, the hollow portion of said stub arms being connected with said hollow U-shaped cradle, a hollow vertical arm arranged telescopically to engage a hollow vertical tube in vacuum-tight relationship, said hollow vertical arm being connected with the hollow portion of said horizontal stub arm, supporting columns provided with guideways, the vertical slide means of said horizontal stub arms being arranged to slide therein enabling said stub arm, vertical arm, cradle and mold to move vertically as a unit with respect to said tank, and a vacuum source connected with said hollow vertical tube, said vacuum source, vertical tube, vertical arm, stub arm and cradle forming a vacuum system for providing a relatively lower pressure in said mold.

2. The apparatus as claimed in claim 1 wherein pneumatic rams are provided for imparting vertical motion to said mold, cradle, stub arms and vertical arms.

3. The apparatus as claimed in claim 1 wherein counterpoise means are provided for counter-balancing the weight of said mold, cradle, stub arms and vertical arms.

4. The apparatus as claimed in claim 1 wherein the vacuum source comprises a vacuum header tank and a vacuum pump, said vacuum source being located within a chamber positioned in the bottom wall of said tank.

5. An apparatus for forming molded bodies of fibrous material comprising an open tank adapted to hold a slurry of fibrous material, a hollow U-shaped cradle made of a horizontal, hollow base and a pair of hollow, vertical legs mounted in and communicated with the hollow interior of said base on opposite sides thereof, a porous mold seated on said hollow base, means communicating the inner side of said mold with the hollow interior of said hollow base, horizontal, outwardly extending arms mounted on the upper ends of said vertical legs, a pair of vertical, supporting columns on opposite sides of said tank, the outer end of one of said arms being vertically-slidably mounted on one of said columns and the outer end of the other of said arms being vertically-slidably mounted on the other of said columns, power means operable on said arms for raising and lowering said mold seated on said U-shaped cradle into and out of said tank, a vacuum source, and rigid, hollow means including vertical tubes adjacent each of said vertical columns and telescoped in air-tight relationship connecting said vacuum source with said hollow, vertical legs to provide a low pressure in said hollow, horizontal base and at the inner side of said mold for forming a molding of said fibrous material on the outer side of said mold when said mold is immersed in a slurry of fibrous material in said tank and for conveying liquid drawn through said porous mold during the formation of said molding.

References Cited in the file of this patent

UNITED STATES PATENTS

| | | |
|---|---|---|
| 725,966 | Howard | Apr. 21, 1903 |
| 2,723,600 | Kyle | Nov. 15, 1955 |
| 2,963,397 | McLeod | Dec. 6, 1960 |

FOREIGN PATENTS

| | | |
|---|---|---|
| 657,486 | Great Britain | Sept. 19, 1951 |